US007255790B2

(12) United States Patent
Rogers et al.

(10) Patent No.: US 7,255,790 B2
(45) Date of Patent: Aug. 14, 2007

(54) HYDROCYCLONES

(75) Inventors: Brian Leslie Rogers, Woronora Heights (AU); Kerry John Lawrence, Currambine (AU); Oscar Miguel Castro, Santiago (CL); Paul Martin Yexley, Wiltshire (GB); Anthony Ronald Przybylek, Verona, WI (US)

(73) Assignee: Weir Warman Ltd., Artarmon (AU)

( * ) Notice: Subject to any disclaimer, the term of this patent is extended or adjusted under 35 U.S.C. 154(b) by 424 days.

(21) Appl. No.: 10/473,016

(22) PCT Filed: Mar. 25, 2002

(86) PCT No.: PCT/AU02/00347

§ 371 (c)(1),
(2), (4) Date: Apr. 8, 2004

(87) PCT Pub. No.: WO02/076622

PCT Pub. Date: Oct. 3, 2002

(65) Prior Publication Data

US 2005/0173335 A1 Aug. 11, 2005

(30) Foreign Application Priority Data

Mar. 26, 2001 (AU) .................................... PR3992
May 2, 2001 (AU) .................................... PR4724

(51) Int. Cl.
*B01D 17/038* (2006.01)
*B01D 21/26* (2006.01)
*B04C 5/14* (2006.01)

(52) U.S. Cl. ................... 210/512.1; 210/788; 209/715; 209/721; 209/727; 209/732; 55/459.1

(58) Field of Classification Search ................ 210/788, 210/512.1; 209/715, 721, 727, 732; 55/459.1
See application file for complete search history.

(56) References Cited

U.S. PATENT DOCUMENTS

| | | | | |
|---|---|---|---|---|
| 5,085,677 | A | 2/1992 | Ville et al. | 55/205 |
| 6,071,424 | A * | 6/2000 | Tuszko et al. | 210/512.1 |
| 6,461,499 | B1 * | 10/2002 | Bosman | 210/512.1 |

FOREIGN PATENT DOCUMENTS

| | | |
|---|---|---|
| AU | 200018483 | 2/2000 |

(Continued)

OTHER PUBLICATIONS

Application 3424 2000 (Petroleo Brasileiro S.A.) Dec. 13, 2000, Republic of Chile.

(Continued)

*Primary Examiner*—David A. Reifsnyder
(74) *Attorney, Agent, or Firm*—Morriss O'Bryant Compagni

(57) ABSTRACT

A hydrocyclone which includes a main body having a chamber therein, the chamber including an inlet section, and a separating section, the separating section having an inner side wall which tapers inwardly away from the inlet section, the hydrocyclone further including a feed inlet feeding a particle bearing slurry mixture into the inlet section of the chamber, an overflow outlet at one end of the chamber adjacent the inlet section thereof, and an underflow outlet at the other end of the chamber remote from the inlet section of the chamber. The hydrocyclone further includes an overflow outlet control chamber adjacent the inlet section of the chamber of the hydrocyclone and in communication therewith via the overflow outlet, the overflow outlet control chamber including a tangentially located discharge outlet and a centrally located air core stabilising orifice which is remote from the overflow outlet.

6 Claims, 2 Drawing Sheets

FOREIGN PATENT DOCUMENTS

| | | |
|---|---|---|
| AU | 200071784 | 11/2000 |
| AU | 200189252 | 11/2001 |
| DE | 195 08 430 | 12/1996 |
| EP | 037 278 | 10/1981 |
| GB | 2 036 606 | 7/1980 |
| GB | 2 090 163 | 7/1982 |
| WO | WO 81/01961 | 7/1981 |
| WO | WO 81/01961 | 7/1982 |
| WO | WO 91/14491 | 10/1991 |

OTHER PUBLICATIONS

David, D. "HMS Cyclone Development at Argyle Diamonds" The AusIMM Annual Conference, Perth, AU, pp. 265-272, Mar. 24-28, 1996.

Castro, O et al., "Air core modelling for an industrial hydrocyclone," Hydrocylones International Conference, Cambridge, UK, pp. 229-239, Apr. 2-4, 1996.

Bradley, D., "The Hydrocyclone," Oxford, New York, Pergamon Press, 1965.

Application 1980-99 (University of Queensland, Australia) Aug. 27, 1999 (DN1), Republic of Chile.

Application 582-97 (CPC International) Mar. 27, 1997 (DN2), Republic of Chile.

Application 375-00 (Multotec Process Equipment) Feb. 21, 2000 (DN3), Republic of Chile.

Application 1361-00 (Krebs International) May 26, 2000, Republic of Chile.

Application 1140-99 (Vulco S.A.) Jun. 2, 1999, Republic of Chile.

Precautionary Patent 1420 (Mario Garcia Jimenez) Jul. 11, 1994.

CL 32390 (Pablo Letelier Alemyda) Nov. 17, 1980, Republic of Chile.

* cited by examiner

HYDROCYCLONES

This invention relates generally to hydrocyclones and more particularly, but not exclusively, to hydrocyclones suitable for use in the mineral and chemical processing industries. The invention is also concerned with components associated with hydrocyclones and methods of optimising their performance.

Hydrocyclones are used for separating suspended matter carried in a flowing liquid such as a mineral slurry into two discharge streams by creating centrifugal forces within the hydrocyclone as the liquid passes through a conical shaped chamber. Basically, hydrocyclones include a conical separating chamber, a feed inlet which is usually generally tangential to the axis of the separating chamber and is disposed at the end of the chamber of greatest cross-sectional dimension, an underflow outlet at the smaller end of the chamber and an overflow outlet at the larger end of the chamber. The feed inlet is adapted to deliver the liquid containing suspended matter into the hydrocyclone separating chamber and the arrangement is such that the heavy matter tends to migrate towards the outer wall of the chamber and towards and out through the centrally located underflow outlet. Finer particle sized material migrates towards the central axis of the chamber and out through the overflow outlet. Hydrocyclones can be used for separation by size of the suspended solid particles or by particle density. Typical examples include solids classification duties in mining and industrial applications.

For enabling efficient operation of hydrocyclones the form of the discharge through the underflow outlet is important. It is known that a hydrocyclone operates more efficiently under a spray discharge at the underflow discharge outlet as opposed to what is known as rope discharge. Spray discharge is where the discharge from the underflow outlet is in the form of an umbrella shaped spray. In a rope discharge the discharge is highly concentrated and tends to choke the underflow outlet diminishing the throughput of the hydrocyclone.

In normal operation such hydrocyclones develop a central air column which is typical of most industrially applied hydrocyclone designs. The air column is established as soon as the fluid at the hydrocyclone axis reaches a pressure below the atmospheric pressure. This air column extends from the underflow outlet to the overflow outlet and simply connects the air immediately below the hydrocyclone with the air at the top. The cross sectional area of the air core is an important factor in influencing the underflow discharge condition which can vary from the typical spray pattern to the extreme condition known as roping. Roping occurs when the solids concentration in the underflow discharge stream reach a critical value and a solid rope of material is discharged. At this condition the air core collapses at the underflow outlet and the underflow outlet discharge capacity is reduced. The reduced discharge capacity compromises the efficiency of the hydrocyclone process and system operating variables are normally required to be changed to reestablish the air core and hence normal hydrocyclone operation.

Existing hydrocyclone designs do not acknowledge the importance of air core cross sectional area or stability of the air column. In most hydrocyclones a simple curved pipe carries away the overflow stream. The air column remains captive within the overflow stream and consequently the air core diameter and hence its cross sectional area remains compressed. Furthermore within the overflow pipe the spinning motion of the overflow stream changes chaotically into linear flow and continuity of the air column is destroyed.

It is an object of the present invention according to one aspect of the invention to provide an improved hydrocyclone in which the air core formed during operation can be stabilised and maximised with respect to its cross sectional area It is another object of the present invention according to a further aspect to provide a method of optimising performance of a hydrocyclone. Yet another object of the present invention according to a further aspect is to provide an overflow control device for use with a hydrocyclone.

According to one aspect of the invention a hydrocyclone is provided with an overflow discharge control chamber with an air core stabilising orifice, the combination of which separates the overflow stream from the air column.

The arrangement as described above in its preferred form has been found to promote a stable cyclone discharge flow, minimise any back pressure on the cyclone system process, maximise the cross-sectional area of the central axial air core generated within the cyclone, maximise throughput of product in terms of, for example, tonnage per hour, and maintain the cyclone separation process at a stable level.

The hydrocyclone can be controlled so as to operate at a steady state and deter the tendency towards the formation of a rope type discharge at the underflow discharge outlet. Regulation of the air inlet flow can be used to influence the formation, maximisation of cross-sectional area and stabilisation of the cyclone air core. Furthermore, the air core stabilising orifice provides the potential opportunity to view the internal operation of the hydrocyclone for more advanced process control as hydrocyclone technology develops.

According to another aspect of the present invention, there is provided a hydrocyclone which includes a main body having a chamber therein, the chamber including an inlet section, and a separating section, the separating section having an inner side wall which tapers inwardly away from the inlet section. The hydrocyclone further includes a feed inlet feeding a particle bearing slurry mixture into the inlet section of the chamber, an overflow outlet at one end of the chamber adjacent the inlet section thereof, and an underflow outlet at the other end of the chamber remote from the inlet section of the chamber. The hydrocyclone further includes an overflow outlet control chamber adjacent to the inlet section of the chamber of the hydrocyclone and in communication therewith via the overflow outlet. The overflow outlet control chamber includes a tangentially located discharge outlet and a centrally located air core stabilising orifice, which is remote from the overflow outlet.

Preferably, the stabilising orifice, overflow outlet and underflow outlet are generally axially aligned.

In one preferred form, the overflow outlet control chamber has an inner surface which is generally in the shape of a volute for directing material entering the overflow outlet control chamber from the separation chamber towards the discharge outlet. Preferably, the volute extends around the inner surface for up to 360°.

In a preferred form of the invention, the inlet section of the chamber has an inner surface which is generally in the shape of a volute and preferably the volute is ramped axially toward the converging end of the separation chamber and extends around the inner surface for up to 360°.

The hydrocyclone may further include a vortex finder at the overflow outlet of the separation chamber.

In one preferred form of the invention, the stabilising orifice comprises tapering side walls which extend into the control chamber. Preferably, the orifice has a generally conical shaped inlet section.

According to yet another aspect of the present invention there is provided a control unit which is suitable for use with a hydrocyclone, the hydrocyclone including a main body having a chamber therein, the chamber including an inlet section and a separating section, the separating section having an inner side wall which tapers inwardly away from the inlet section, a feed inlet for a feeding mixture into the inlet section of the chamber, an overflow outlet at one end of the chamber adjacent to the inlet section and an underflow outlet at the other end of the chamber remote from the inlet section of the chamber. The control unit includes a control chamber having a discharge outlet. a communication port operatively connected to the overflow outlet and a stabilising orifice which is remote from the overflow outlet.

In a preferred form, the control chamber may be in the form described earlier. In addition, the hydrocyclone may be of the type described earlier.

According to yet another aspect of the present invention there is provided a method of stabilising the air core of a hydrocyclone when in use, the method including the steps of providing a chamber above the overflow outlet of a hydrocyclone and arranging for discharge from that chamber through a discharge outlet and incorporating an air core stabilising orifice in a wall of that chamber remote from the overflow outlet.

The arrangement as described above in its preferred form has been found to promote a stable cyclone discharge flow, minimise any back pressure on the cyclone system process, maximise the cross-sectional area of the central axial air core generated within the cyclone, maximise throughput of product in terms of, for example, tonnage per hour, and maintain the cyclone separation process at a stable level.

The hydrocyclone can be controlled so as to operate at a steady state and deter the tendency towards the formation of a rope type discharge at the underflow discharge outlet. Regulation of the air inlet flow can be used to influence the formation, maximisation of cross-sectional area and stabilisation of the cyclone air core. Furthermore, the air core stabilising orifice provides the potential opportunity to view the internal operation of the hydrocyclone for more advanced process control as hydrocyclone technology develops.

Preferred embodiments of the invention will hereinafter be described with reference to the accompanying drawings and in these drawings.

Figure 1:
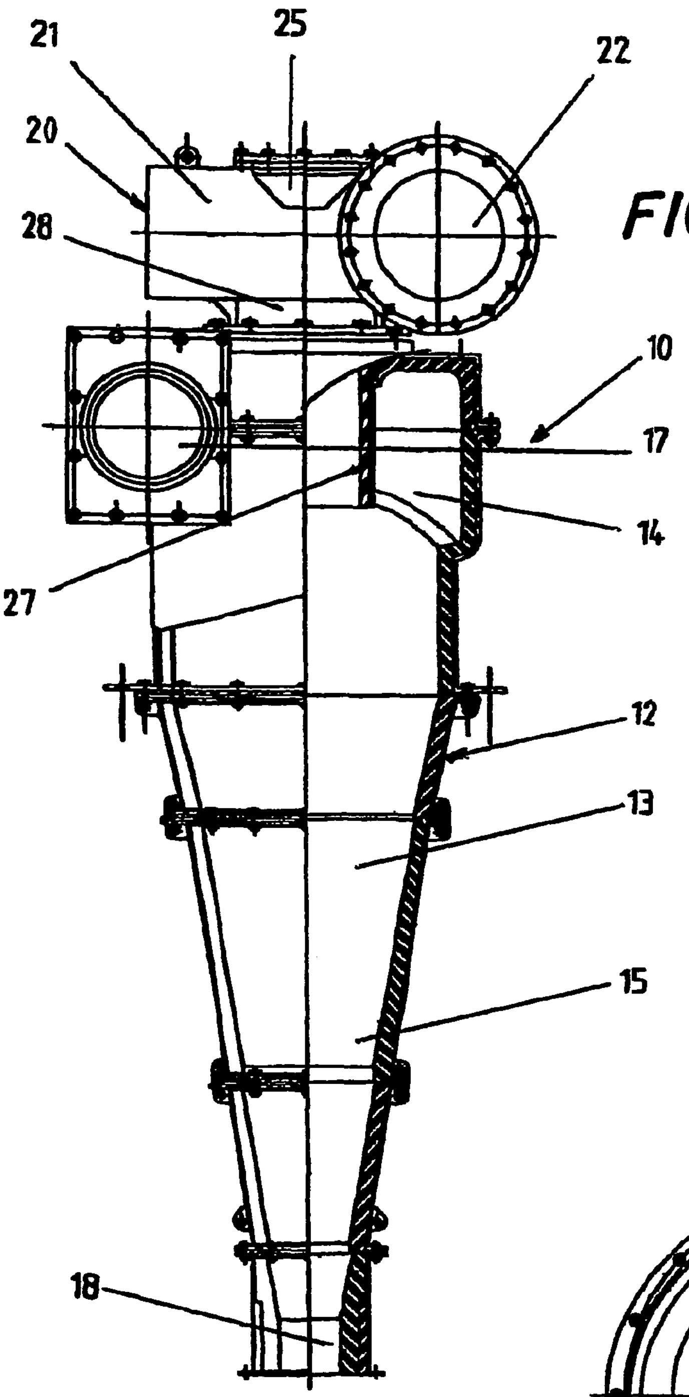
FIG. 1 is a schematic partial sectional view of a hydrocyclone according to the present invention.
Figure 2:
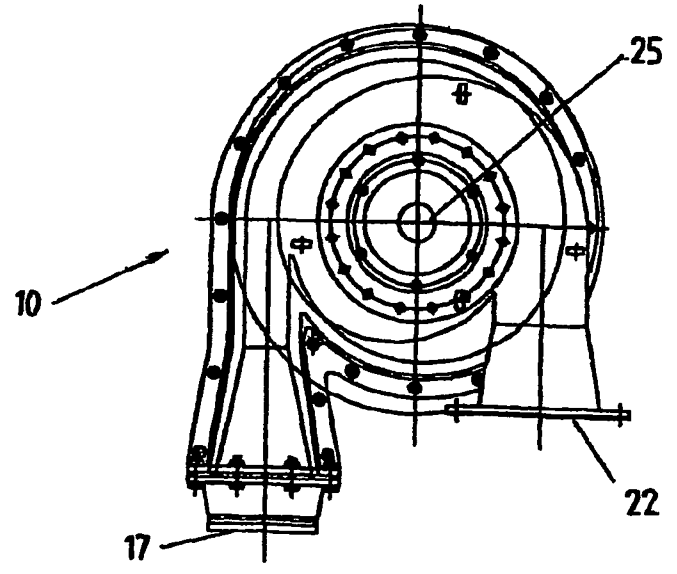
FIG. 2 is a plan view of the hydrocyclone shown in FIG. 1.

Referring to the drawings, there is shown a hydrocyclone generally indicated at 10 which includes a main body 12 having a chamber 13 therein, the chamber 13 including an inlet section 14, and a conical separating section 15. The hydrocyclone further includes a feed inlet 17 feeding a particle bearing slurry mixture into the inlet section 14 of the chamber. An overflow outlet or vortex finder 27 is provided at one end of the chamber adjacent the inlet section thereof, and an underflow outlet 18 at the other end of the chamber remote from the inlet section of the chamber. The hydrocyclone further includes a control unit 20 having an overflow outlet control chamber 21 adjacent the inlet section of the chamber of the hydrocyclone and in communication therewith via the overflow outlet. The overflow outlet control chamber includes a tangentially located discharge outlet 22 and a centrally located air core stabilising orifice 25 which is remote from the overflow outlet. The stabilising orifice, overflow outlet and underflow outlet are generally axially aligned.

The overflow outlet control chamber 21 has an inner surface which is generally in the shape of a volute for directing material entering the overflow outlet control chamber from the separation chamber towards the discharge outlet. Preferably, the volute extends around the inner surface for up to 360°.

The inlet section 14 of the chamber 13 of the hydrocyclone has an inner surface, which is generally in the shape of a volute and preferably the volute is ramped axially toward the converging end of the separation chamber and extends around the inner surface for up to 360°.

The stabilising orifice 25 comprises tapering side walls which extend into the control chamber, which as shown form a generally conical shaped inlet section. The control unit 20 may be integral with the hydrocyclone or separate therefrom so that it enables it to be retrofitted to existing hydrocyclones.

Figure 3:
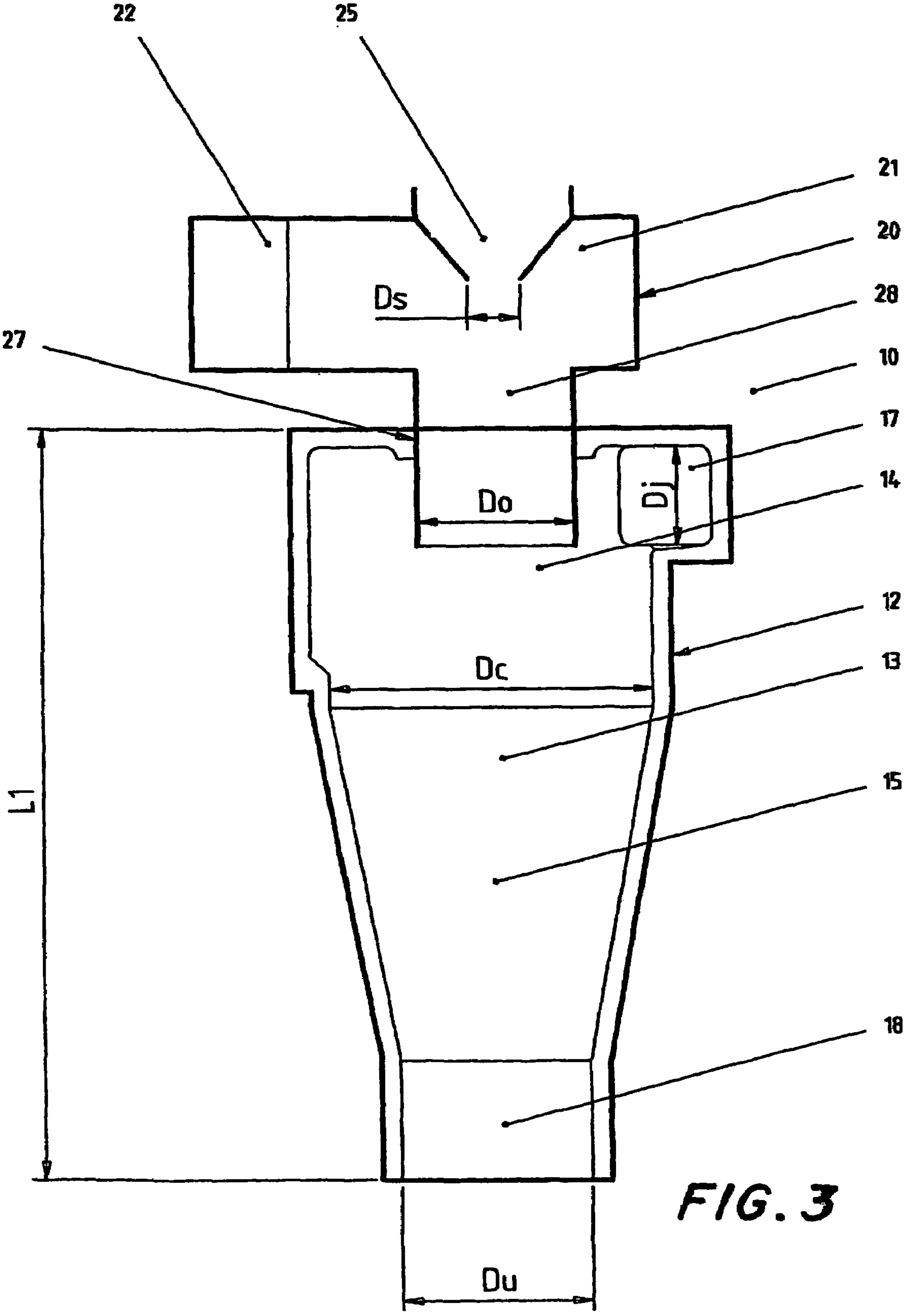
FIG. 3 is a schematic sectional side elevation showing several key dimensions.

FIG. 3 of the drawings indicates several dimensions of the hydrocyclone, which can influence the operation thereof These are defined as follows:

$D_J$=diameter of the feed inlet $D_U$=diameter of the underflow outlet $D_O$=diameter of the overflow outlet $D_S$=diameter of the stabilising orifice $D_C$=diameter of the inlet section of the hydrocyclone chamber $L_1$=overall length of the hydrocyclone Examples of preferred ratios of these dimensions are set out below.

Dj=0.20 to 0.34 Dc

Do=0.20 to 0.45 Dc

Du=0.30 to 0.75 Do

L1=3.0 to 8.0 Dc

Ds=0.0 to 1.0 Do

Finally, it is to be understood that various alterations, modifications and/or additions may be incorporated into the various constructions and arrangements of parts without departing from the spirit or ambit of the invention.

The invention claimed is:

1. A hydrocyclone which includes a main body having a chamber therein, the chamber including an inlet section, and a separating section, the separating section having an inner side wall which tapers inwardly away from the inlet section, the hydrocyclone further including a feed inlet feeding a particle bearing slurry mixture into the inlet section of the chamber, an overflow outlet at one end of the chamber adjacent to the inlet section thereof, and an underflow outlet at the other end of the chamber remote from the inlet section of the chamber, the hydrocyclone further including an overflow outlet control chamber adjacent to the inlet section of the chamber of the hydrocyclone and in communication therewith via the overflow outlet, the overflow outlet control chamber including a tangentially located discharge outlet and a centrally located air core stabilising orifice which is remote from the overflow outlet, said stabilising orifice having a generally conical shaped inlet section having tapering side walls which extend into the overflow outlet control chamber, said stabilising orifice, overflow outlet and underflow outlet being generally axially aligned, and said overflow outlet control chamber having an inner surface which is generally in the shape of a volute for directing material entering the overflow outlet control chamber from the separation chamber towards the discharge outlet.

2. A hydrocyclone according to claim 1 wherein the volute of said overflow outlet control chamber extends around the inner surface of said control chamber for up to 360°.

3. A hydrocyclone according to claim 2 wherein the inlet section of the chamber of the hydrocyclone has an inner surface which is generally in the shape of a volute, the volute being ramped axially toward the covering end of the separation chamber and extend around the inner surface of the inlet section for up to 360°.

4. A hydrocyclone according to claim 3 further including a vortex finder at the overflow outlet of the separation chamber.

5. A control unit suitable for use with a hydrocyclone, having a main body with a chamber therein, the chamber including an inlet section and a separating section where the separating section has an inner side wall which tapers inwardly away from the inlet section, a feed inlet for feeding a mixture into the inlet section of the chamber, an overflow outlet at one end of the chamber adjacent the inlet section and an underflow outlet at the other end of the chamber remote from the inlet section of the chamber, the control unit comprising a control chamber having a discharge outlet, a communication port operatively connected to the overflow outlet and a stabilising orifice which is remote from the overflow outlet, said stabilising orifice having a generally conical shaped inlet section with tapering side walls which extend into the control chamber, said control chamber having an inner surface which is generally in the shape of a volute for directing material entering the overflow outlet control chamber from the separation chamber towards the discharge outlet.

6. A control unit according to claim 5 wherein the volute of said control chamber extends around the inner surface for up to 360°.

* * * * *